(12) United States Patent
Hoshizaki

(10) Patent No.: US 8,249,800 B2
(45) Date of Patent: Aug. 21, 2012

(54) METHOD AND APPARATUS TO DETECT PLATFORM STATIONARY STATUS USING THREE-AXIS ACCELEROMETER OUTPUTS

(75) Inventor: Takayuki Hoshizaki, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 527 days.

(21) Appl. No.: 12/455,923

(22) Filed: Jun. 9, 2009

(65) Prior Publication Data
US 2010/0312473 A1     Dec. 9, 2010

(51) Int. Cl.
*G01C 21/12* (2006.01)
*G06F 19/00* (2006.01)

(52) U.S. Cl. .................. 701/400; 701/500; 455/456.1

(58) Field of Classification Search .............. 701/200, 701/213, 216, 220, 214, 217; 455/456.1; 702/141, 153; 74/488
See application file for complete search history.

(56) References Cited

U.S. PATENT DOCUMENTS

| | | | |
|---|---|---|---|
| 5,736,923 A * | 4/1998 | Saab .......................... 340/429 |
| 6,480,152 B2 | 11/2002 | Lin et al. |
| 6,993,451 B2 * | 1/2006 | Chang et al. .................. 702/153 |
| 7,707,906 B2 * | 5/2010 | Lin et al. .......................... 74/488 |
| 7,711,483 B2 * | 5/2010 | Colley ............................ 701/217 |
| 2002/0128775 A1 * | 9/2002 | Brodie et al. .................. 701/216 |
| 2003/0135327 A1 * | 7/2003 | Levine et al. .................. 701/220 |
| 2010/0211315 A1 * | 8/2010 | Toda .............................. 701/216 |
| 2011/0015892 A1 * | 1/2011 | Lee et al. ...................... 702/141 |

FOREIGN PATENT DOCUMENTS

| | | |
|---|---|---|
| JP | 08-043113 | 2/1996 |
| JP | 2006-329972 | 12/2006 |
| JP | 2007-240532 | 9/2007 |
| JP | 2008-076389 | 4/2008 |

* cited by examiner

*Primary Examiner* — Tan Q Nguyen
(74) *Attorney, Agent, or Firm* — Muramatsu & Associates

(57) ABSTRACT

A system with a capability of detecting the platform stationary status is disclosed. The first aspect is to measure three raw acceleration outputs from an apparatus of the three-axis accelerometer unit. The second aspect is to compute the mean of the latest said acceleration outputs obtained from the three-axis accelerometer unit. The third aspect is to subtract the said mean acceleration outputs from the said raw acceleration outputs obtained from the three axis accelerometer unit to find the differential acceleration components between raw and mean values. The fourth aspect is to compute the amplitude of the differential acceleration, i.e., squared total sum of the three differential acceleration components. The fifth aspect is to count the number of measurements in which the amplitude of the differential acceleration is below a certain threshold, e.g., 0.05 (m/s$^2$) to detect the stationary status if the small amplitude lasts for a certain time length, e.g., 1 second.

12 Claims, 10 Drawing Sheets

1 three-axis accelerometer on the sensor board 1 double-axis accelerometer and 1 single-axis accelerometer on the sensor board 3 single-axis accelerometer on sensor board

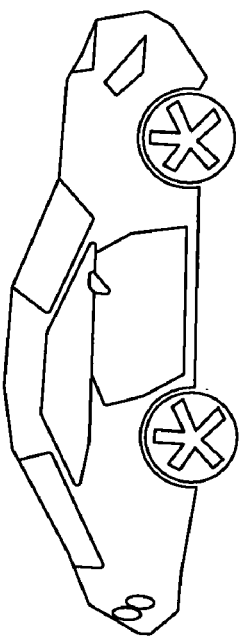
Fig. 3
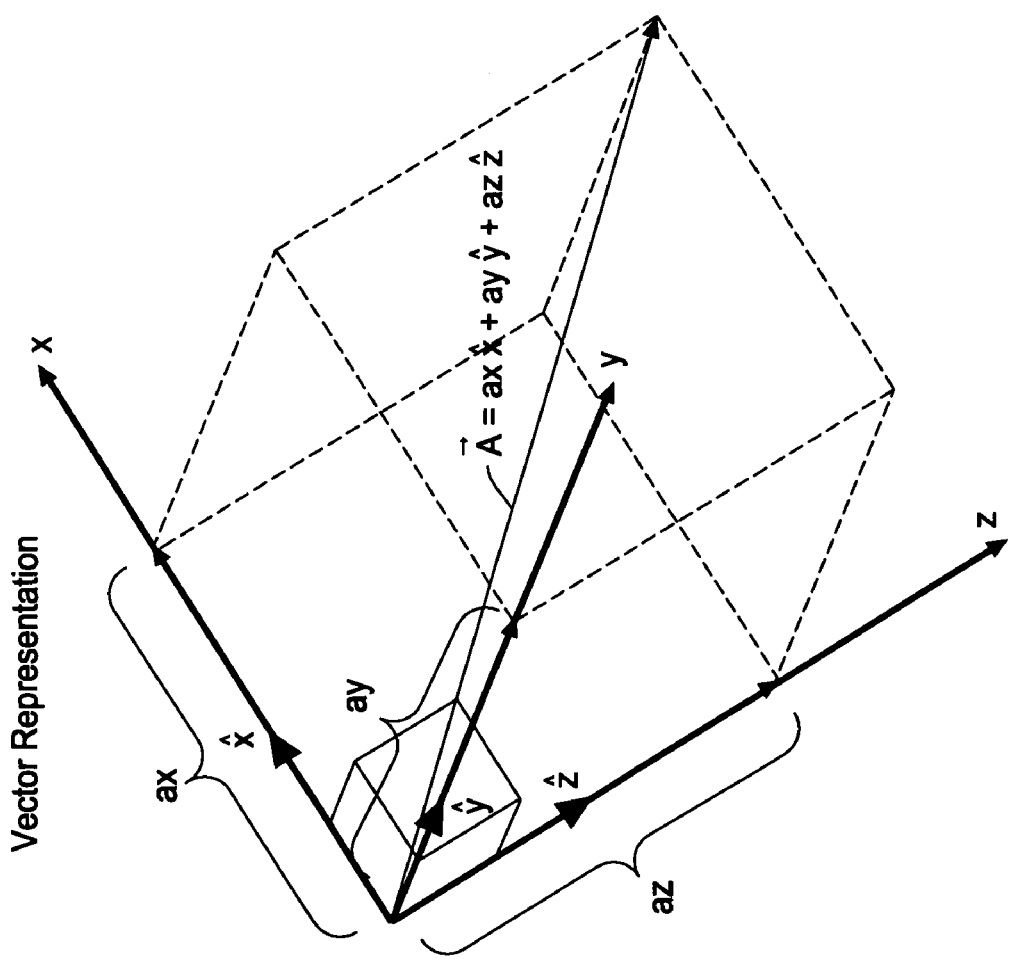

Conventional Navigation: Undetected Stops

Invention Applied: Detected Stops

METHOD AND APPARATUS TO DETECT PLATFORM STATIONARY STATUS USING THREE-AXIS ACCELEROMETER OUTPUTS

FIELD OF THE INVENTION

This invention relates to a method and apparatus involving a vehicle and human navigation system, and more particularly, a system to detect the platform stationary status using three-axis accelerometer outputs. A unique three dimensional vector analysis of this invention allows accurate detection of stationary status with a cost effective apparatus, independence from speed (odometry) pulses, free sensor unit orientation, free vehicle motion direction, and versatile platform applications including automobiles, motorcycles, humans, aircraft, and so on.

BACKGROUND OF THE INVENTION

The inertial navigation system (INS) is a widely used technology for guidance and navigation of a vehicle. The INS is composed of an inertial measurement unit (IMU) and a processor wherein an IMU houses accelerometers and gyroscopes which are inertial sensors detecting platform motion with respect to an inertial coordinate system. A conventional computational scheme for an INS commonly known in the art offers an exact formula applicable well to a system with high-end inertial sensors such as ring laser gyros to track the platform six degrees of freedom without any conditions in the platform dynamics. An important advantage of the INS is independence from external support, i.e., it is self-contained. The INS, however, cannot provide high accuracy for a long range because errors accumulate over time, i.e., the longer travel time, the greater inaccuracy.

More recent development in the global positioning system (GPS) has made high accuracy vehicle navigation possible at low cost. The GPS provides accurate position and velocity over a longer time period, however, the GPS involves occasional large multipath errors and signal dropouts. This is because the GPS relies on GPS satellite signals which are susceptible to environmental conditions such as jamming, RF (radio frequency) interference, and multipath problems. Therefore, efforts are made to develop integrated INS/GPS navigation systems by combining the outputs of a GPS receiver and an INS using a Kalman filter to remedy the performance problems of both systems.

Inertial sensors used to be expensive and bulky, thus only used in precision application, e.g., aerospace and military navigation. For establishing an IMU package in a compact and inexpensive manner, efforts have been made to develop micro-electro mechanical system (MEMS) sensors resulting in commercialization of low-cost, small, but noisier MEMS inertial sensors. MEMS-INS application has interested the automotive industry as potential replacement for speed (or, odometry) pulses which give specific numbers of pulses per wheel rotation at the expense of tedious wiring. In MEMS-INS application, however, erroneous accelerations quickly accumulate when GPS dropouts because of the large amount of noise, bias, and limited accuracy in orientation determination.

This often results in erroneously estimated motion with increasing speed while actually being stationary. To prevent this issue and to take corrective action, Japanese Patent No. 3404905 issued to Matsushita discloses a technique to detect the stationary status by the amplitude of the acceleration vertical to the vehicle. This allows coarse detection of motion/stationary status of the vehicle by noisy vertical motion mainly due to the uneven road surface. The vertical acceleration, however, does not sense a vehicle's primary forward or backward motion resulting in often undetected vehicle motion. This issue becomes more and more serious as vehicle motion become quieter due to recent automotive technology development.

Meanwhile, U.S. Pre-Grant Publication number 2008-0071476 filed by Hoshizaki discloses a sophisticated technology to detect vehicle's stationary status using three-axis accelerometer and three-axis gyroscope outputs along a logical flowchart. Use of multiple gyroscopes is, however, hesitated in low-cost application such as automotive navigation because of their high cost compared to accelerometers: one single-axis MEMS gyroscope for automotive specification costs significantly more than one package of three-axis MEMS accelerometer unit for automotive specification.

Therefore, there is a need of a new architecture to detect the platform stationary status (1) very accurately applicable to today's high-performance (very quiet) automobiles; (2) with low-cost MEMS sensors, preferably without using gyroscopes; (3) preferably with free attachment angle and versatile platform applications.

SUMMARY OF THE INVENTION

It is, therefore, an object of the present invention to provide a method and apparatus to accurately detect the platform stationary status using MEMS three-axis accelerometer outputs without using gyroscopes.

One aspect of the present invention is to utilize a three dimensional vector analysis to distinguish platform's stationary status from in-motion status by measuring the amplitude of differential acceleration vector obtained by subtracting the latest mean of three-axis accelerometer outputs with a fixed time window from the raw three-axis accelerometer outputs.

Another aspect of the present invention is an integrated INS/GPS navigation system implementing the stationary status detection method using a low-cost three-axis accelerometer. The integrated INS/GPS navigation system includes:

an INS having a three-axis accelerometer and a stationary status detection unit that receives outputs of the three-axis accelerometer;

a GPS receiver which receives satellite signals from a plurality of satellites to produce GPS measurements indicating an absolute position of the ground vehicle; and a Kalman filter which combines outputs of the INS and the GPS receiver and performs a Kalman filter processing; and wherein the stationary status detection unit determines a stationary status of a platform based on the outputs of the three-axis accelerometer.

According to the present invention: (1) the stationary status is more accurately detected than using a single axis accelerometer suggested in the prior art; (2) the performance does not degrade regardless of the sensor unit orientation; (3) the performance does not degrade regardless of the vehicle motion direction; (4) the applicable platforms are not limited to automobiles but also humans, motorcycles, aircraft, and so on; (5) there is no need to estimate biases nor sensitivities since only RAW sensor outputs are used in which biases are included in the latest mean to be subtracted; (6) the application is cost effective since the sensors to use are only a three-axis accelerometer unit; (7) similar technologies based on speed pulses (odometer pulses) can be replaced with this invention to achieve portability.

BRIEF DESCRIPTION OF THE DRAWINGS

FIG. 3 introduces basic vector algebra terminology involving the outputs of the three-axis accelerometer units.

DETAILED DESCRIPTION OF THE PREFERRED EMBODIMENTS

The present invention will be described in detail with reference to the accompanying drawings. It should be noted that although a ground vehicle is mainly used in the following description, the present invention can be advantageously implemented to other types of vehicles such as humans, motorcycles, commercial aircraft, etc.

System Architecture

Figure 1A:
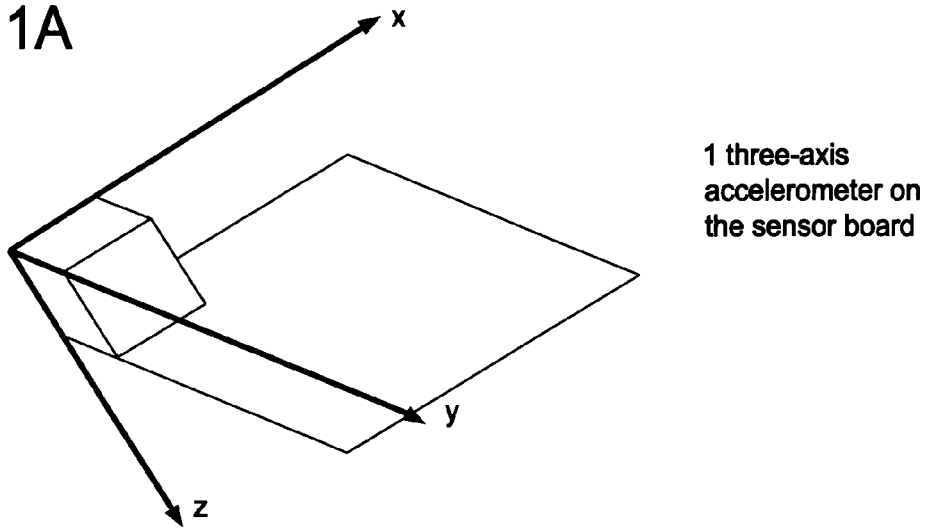
FIGS. 1A-1C show examples of possible arrangement for three-axis accelerometer units in the present invention.
Figure 1B:
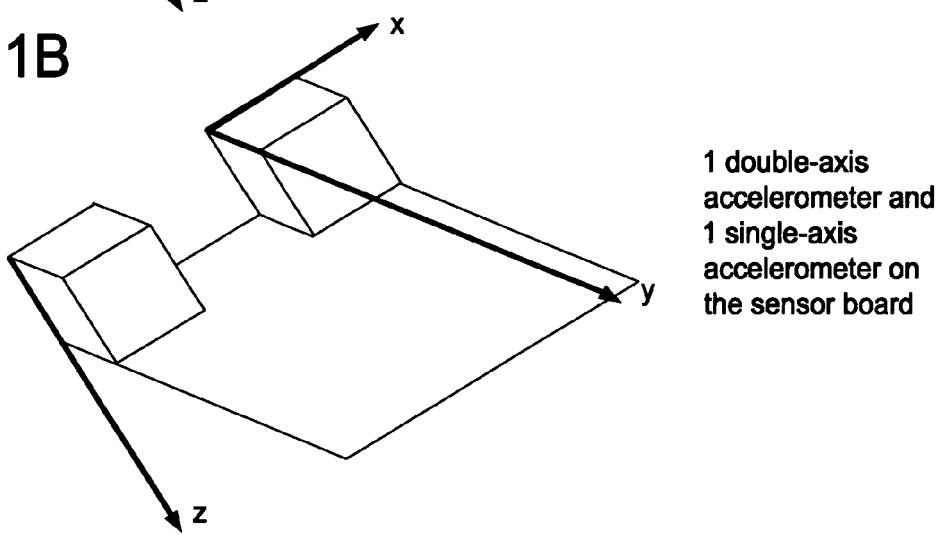
Figure 1C:
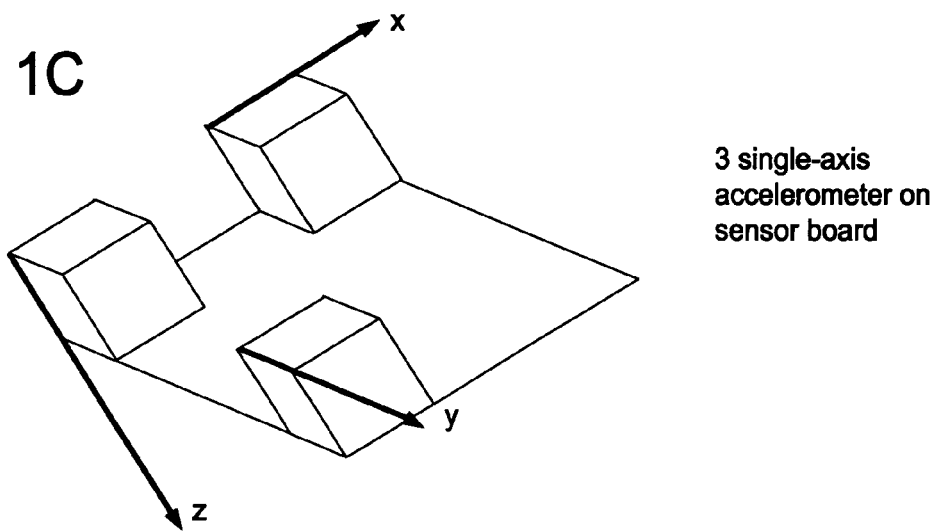

FIGS. 1A-1C show examples of possible arrangement for three-axis accelerometer sensor units that the present invention is applicable. An example of FIG. 1A is a three-axis accelerometer on the sensor board. An example of FIG. 1B is a combination of a double-axis accelerometer and a single-axis accelerometer formed on the sensor board. An example of FIG. 1C is a combination of three single-axis accelerometers formed on the sensor board. Either of one chipset of three-axis accelerometer, one double-axis accelerometer and one single-axis accelerometer, or three single-axis accelerometers on the sensor board is applicable as long as the three axes conform a Cartesian coordinate system (i.e., side-by-side angles between two axes are right angles). Here, x, y, and z represent the three axes of the sensor coordinate system in which each axis is the sensing direction of an accelerometer.

Figure 2A:
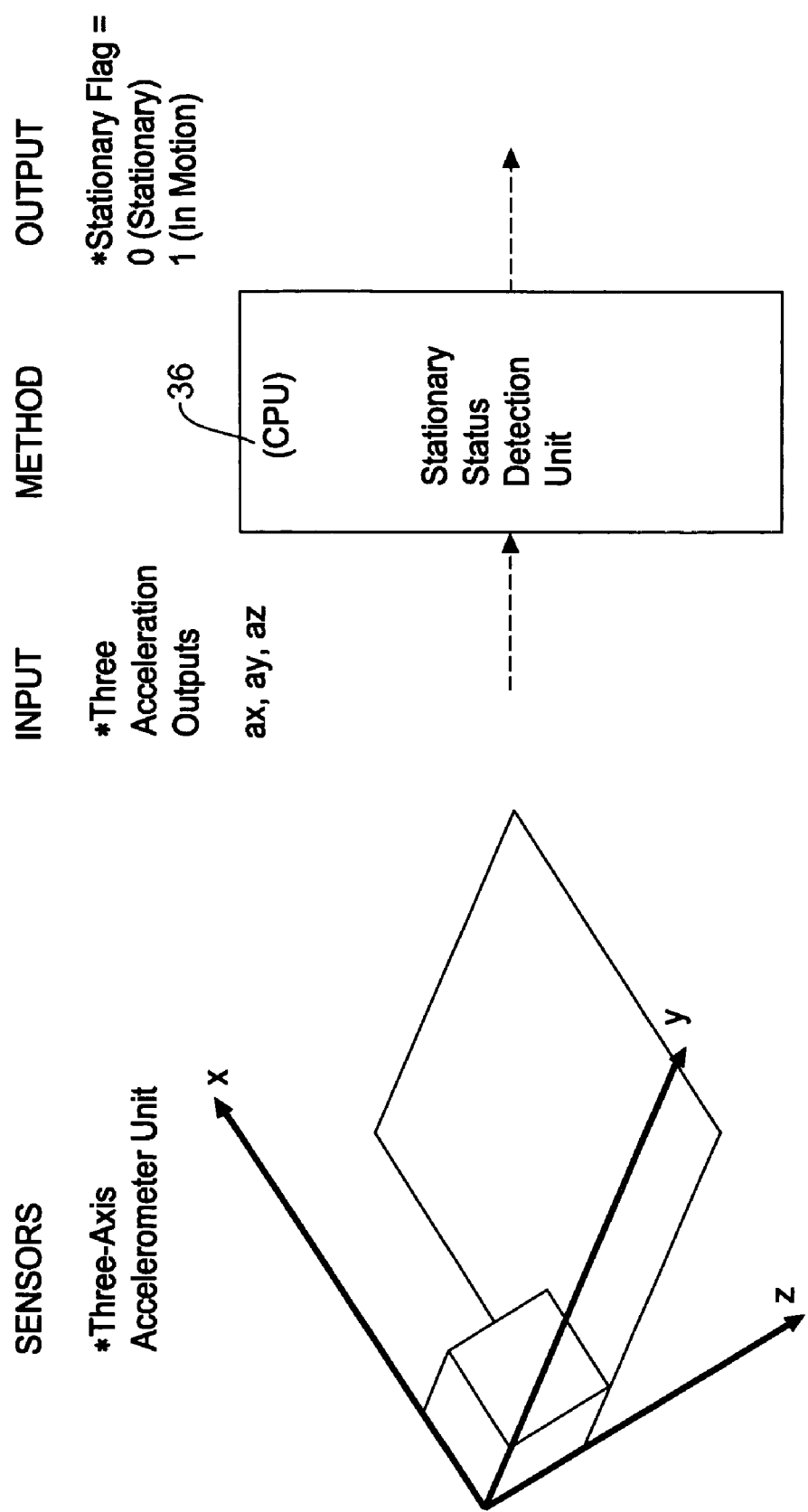
FIG. 2A is a schematic diagram showing an input-output relationship with respect to a stationary status detection unit.

FIG. 2A is a schematic diagram showing an input-output relationship with respect to a stationary status detection unit 36. The inputs are three-axis accelerometer outputs: ax, ay, and az. The output is a flag to indicate the platform stationary status: "0" for "stationary", "1" for "in motion", for example. The stationary status detection unit 36 is a processor for conducting the computational operation as will be described in detail later based on the prescribed program.

Figure 2B:
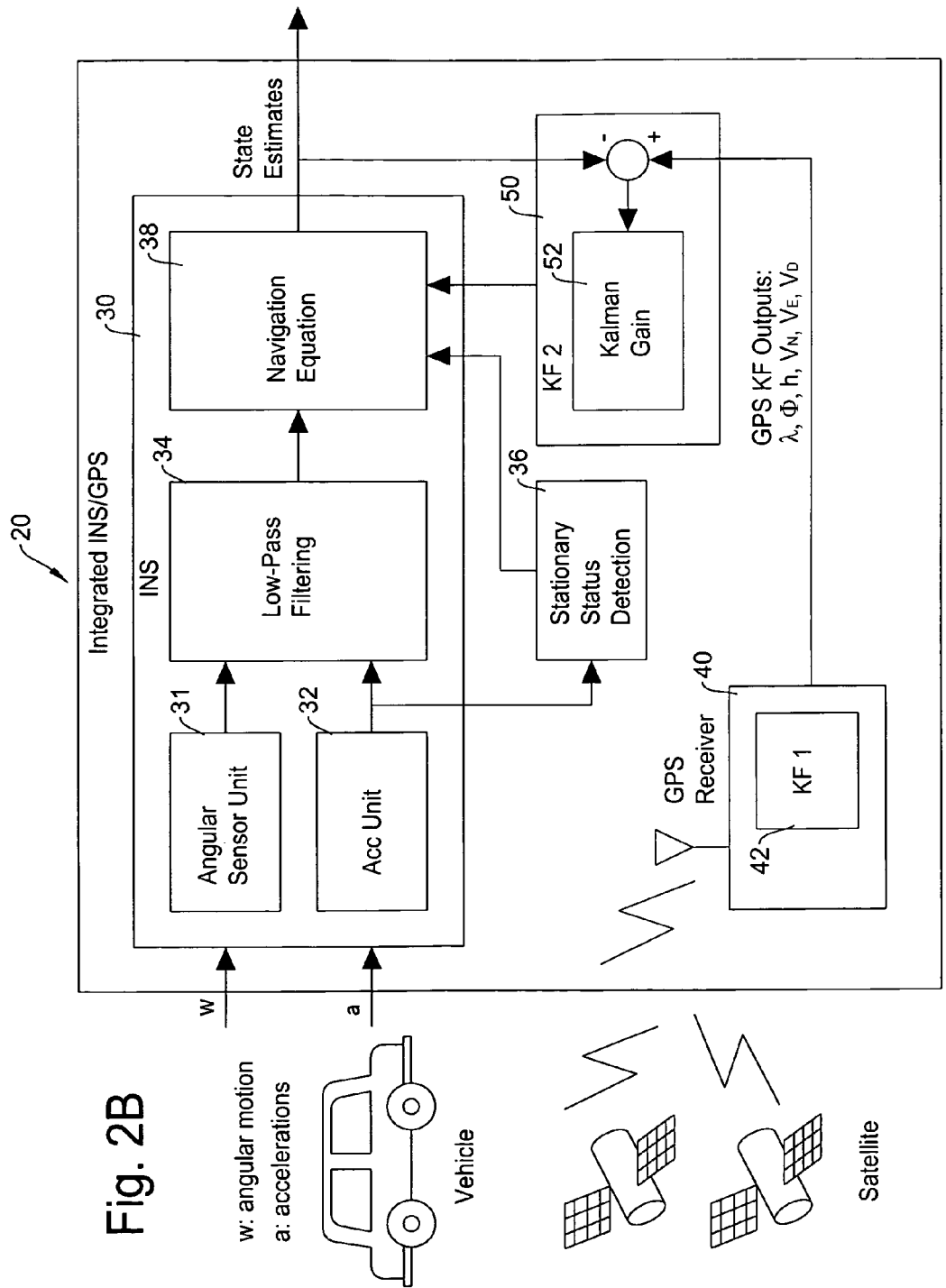
FIG. 2B is a schematic diagram showing an example of an integrated INS/GPS navigation system implementing the present invention.

FIG. 2B is a schematic block diagram showing an example of basic configuration of the integrated INS/GPS navigation system 20 implementing stationary status detection method of the present invention. The integrated INS/GPS navigation system 20 is typically mounted on a ground vehicle but can be applied to other devices such as airplanes, motorcycles, and human bodies, etc. In this example, the INS/GPS navigation system 20 includes an inertial navigation system (INS) 30, a global positioning system (GPS) receiver 40, and a Kalman filter 50 (KF-2). Unlike ordinary GPS navigation systems widely used in automobiles today, the integrated INS/GPS navigation system 20 does not use any speed pulse sensor to detect the moving distance of the automobile. Therefore, it is no longer necessary to establish complicated wiring in the vehicle for connecting a speed pulse sensor to a navigation system's processor. Further, it is unnecessary to adjust the outputs of the speed sensor which was necessary in the conventional technology because the definition of speed pulse is different from manufacturer to manufacturer of speed pulse sensors.

In FIG. 2B, the INS 30 is configured by an angular sensor unit 31, a three-axis accelerometer sensor unit (Acc Unit) 32, a low-pass filtering unit 34, a stationary status detection unit 36, and a navigation equation unit 38. The GPS receiver 40 includes a Kalman filter 42 (KF-1) in addition to GPS signal receiver circuits and a microprocessor (not shown). The Kalman filter 50 (KF-2) includes a Kalman gain unit 52 which provides a gain (coefficient) to each parameter associated with position tracking operations.

The angular sensor unit 31 could be either one of one through three-axis gyroscopes, cameras, three-axis magnetic compasses, multiple accelerometers distantly attached with known geometry, or combinations of those. The Acc Unit 32 is configured as a manner of either one of FIGS. 1A-1C and is created through MEMS (microelectro mechanical system) technologies. The angular sensor unit 31 detects angular motions and the Acc Unit 32 detects accelerations of a platform such as a ground vehicle. The outputs from the angular sensor unit 31 and the Acc Unit 32 are supplied to the low-pass filtering unit 34 in which high frequency components in the outputs thereof are removed. The output data from the low-pass filtering unit 34 is supplied to the navigation equation unit 38 where the current position, velocity and orientation of the vehicle are estimated through the inertial navigation technology. The output data from the Acc Unit 32 is also supplied to the stationary status detection unit 36 where the stationary or in-motion status of the vehicle is detected. The output data from the stationary status detection unit 36 is then supplied to the navigation equation unit 38 to halt the accumulation computation of sensor outputs and make corrective action in case the stationary status is detected.

The GPS receiver 40 receives signals from a plurality of GPS satellites and calculates the estimated location and velocity of the vehicle by comparing clock signals and position and velocity data from the satellites. Typically, the GPS receiver 40 optimizes the obtained position and velocity data by the Kalman filter (KF-1) 42 to minimize the noises on the satellite signals.

The estimated position data from the INS 30 and the estimated position data from the GPS receiver 40 are combined by the Kalman filter (KF-2) 50 which optimally estimates, in real time, the states of the navigation system based on such noisy measurement data. The Kalman gain unit 52 provides weight or gain to each parameter in the measurement data. The output of the Kalman filter 50 is provided to the navigation equation unit 38 to calibrate the estimated position, velocity, and orientation of the vehicle which will be displayed on a navigation monitor screen (not shown).

Physical Meaning

Figure 4:
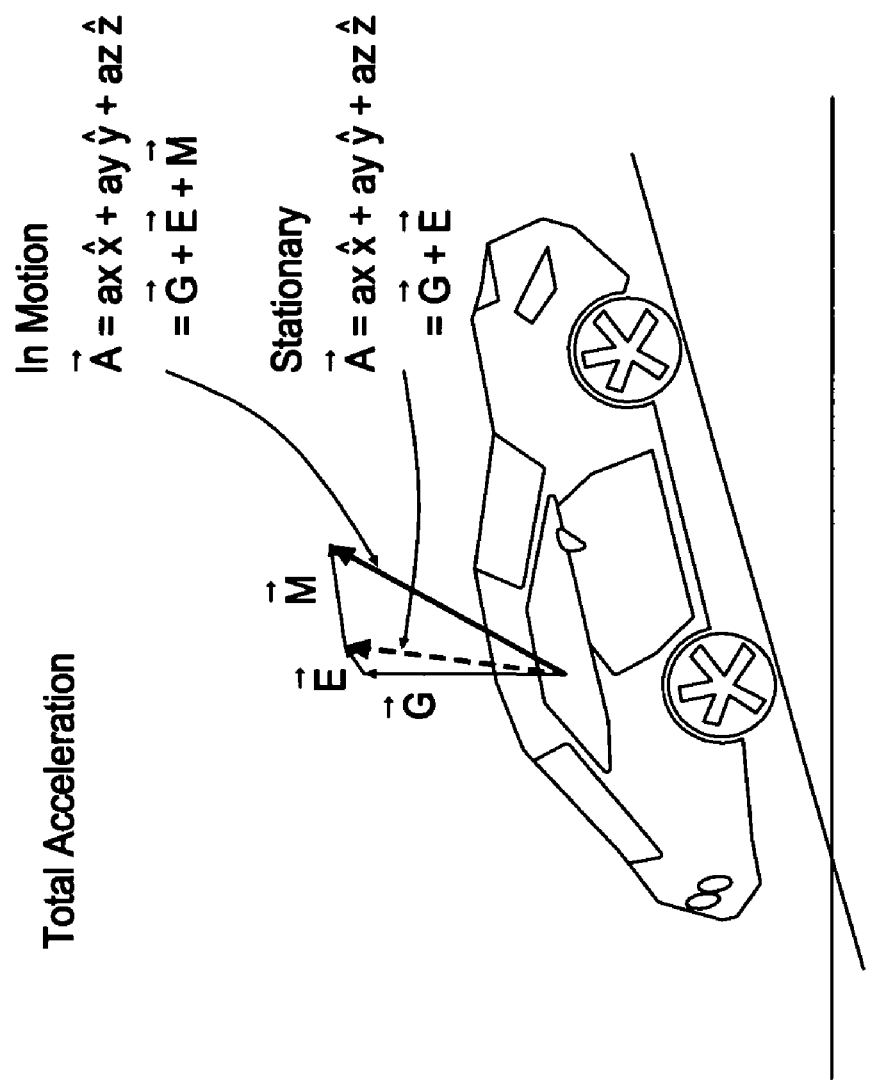
FIG. 4 depicts total acceleration vector of the vehicle obtained by the three-axis accelerometer outputs.

The physical concept and advantages in using the three-axis accelerometer outputs are described in FIGS. 3 and 4. It must be noted that, although a side view of an automobile is used in FIG. 4, there could occur a motion in the lateral direction as well, e.g., centripetal acceleration in cornering.

First, a few items regarding basic vector algebra are introduced for explanation purpose in FIG. 3:

$\hat{x}$, $\hat{y}$, and $\hat{z}$: unit vectors along with x, y, and z axes with magnitude of 1 ax, ay, and az: accelerometer raw outputs along with x, y, and z axes

Using these terminology introduced, we can represent the measured total acceleration vector, or $\vec{A}$, as $$\vec{A} = ax\,\hat{x} + ay\,\hat{y} + az\,\hat{z} \text{ (m/s}^2\text{)} \quad (1)$$

FIG. 4 shows that, by virtue of using the three axis accelerometer unit, the measured total acceleration vector, $\vec{A}$, is equivalent to the sum of the following vectors regardless of the sensor unit orientation or vehicle motion direction:

Apparent Gravity Vector: $\vec{G}$

Sensor Error Vector: $\vec{E}$=Sensor Bias+Noise

Motion Acceleration Vector: $\vec{M}$ or, $$\vec{A} = \vec{G} + \vec{E} + \vec{M} \text{ (m/s}^2\text{)} \quad (2)$$

Here, the gravity vector $\vec{G}$ is always vertically upward with respect to the local horizontal surface with magnitude of 9.8 (m/s$^2$) (although the magnitude of gravity is dependent on a specific locale, the change is too small to be detected by MEMS sensors). The bias component in $\vec{E}$ may slowly change depending upon temperature but almost constant with respect to the sensor unit coordinate system for a short time period. Comparing equations (1) and (2), we have $$\vec{G} + \vec{E} + \vec{M} = ax\,\hat{x} + ay\,\hat{y} + az\,\hat{z} \text{ (m/s}^2\text{)} \quad (3)$$

Equation (3) simply tells that it is always possible to evaluate the total acceleration vector of $\vec{G}+\vec{E}+\vec{M}$ using the three-axis accelerometer outputs regardless of the sensor unit orientation or vehicle motion direction. The other way around, if only the acceleration vertical to the vehicle is analyzed as suggested in the Japanese Patent No. 3404905 noted above, motion acceleration vector $\vec{M}$ in the forward or backward direction will not be detected resulting in undetected motion and misjudge of a stationary status.

Now, in case of stationary status, $\vec{M}$ disappears ($\vec{M}=\vec{0}$) to have $$\vec{A} = \vec{G} + \vec{E} \text{ (m/s}^2\text{)} \quad (4)$$

Also, by virtue of the almost constant nature of $\vec{G}$ and $\vec{E}$, precise estimation of $\vec{G}+\vec{E}$ can be obtained by an average the latest samples, or mean, of the measured total acceleration with a specific time window during a stationary period:

$$\vec{A}_{mean} = \vec{G} + \vec{E} \text{ (m/s}^2\text{)} \quad (5)$$

Because of equations (4) and (5), $$\vec{A} - \vec{A}_{mean} \approx \vec{0} \text{ (m/s}^2\text{)} \quad (6)$$

is guaranteed during a Stationary period. At the same time, it is also true that $$\vec{A} - \vec{A}_{mean} \ne \vec{0} \text{ Happens More Likely}$$

during an in-motion period. Therefore, it is possible to take the amplitude of $\vec{A}-\vec{A}_{mean}$, or $|\vec{A}-\vec{A}_{mean}|$ as the measure of detecting stationary status.

Detection Process

The procedure of the present invention for detecting the stationary status of the platform is described with reference to the graphs of FIGS. 5-10 and the flow chart of FIG. 11. It should be noted that the underlined parameter values shown in the flow chart of FIG. 11 may be altered according to the platform (vehicle, motor cycle, etc.), sensor performance, and other conditions. It should also be noted that, although not specifically shown in the flow chart of FIG. 11, there is a step of mounting the three-axis accelerometer on the platform such as a vehicle where orientation of the accelerometer can be freely made without suffering accuracy in the detection of stationary status.

Figure 5:
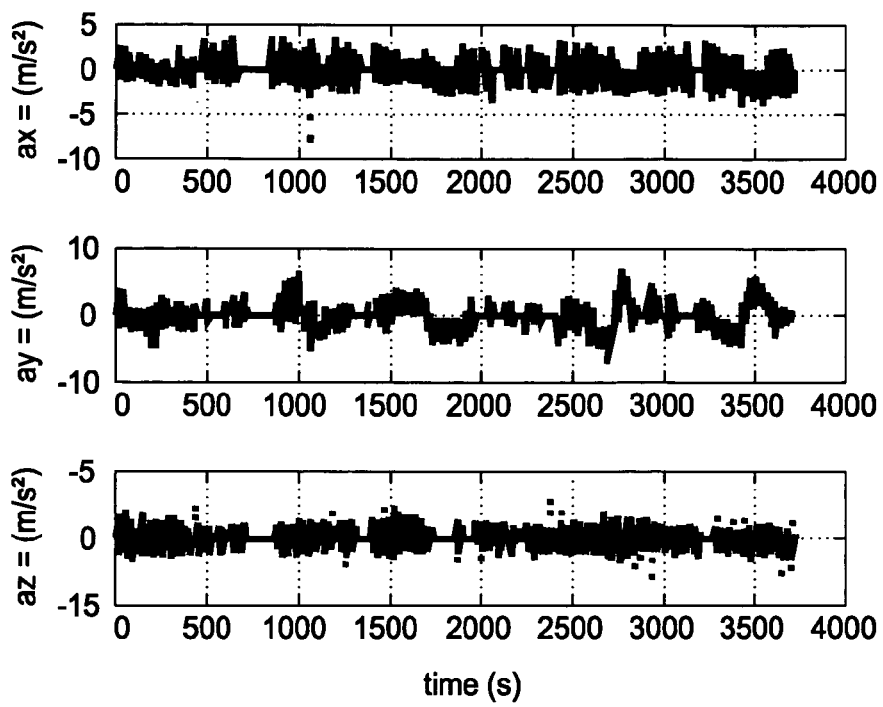
FIG. 5 shows an example of the actual sensor RAW outputs of a three-axis accelerometer unit: ax, ay, and az.
Figure 11:
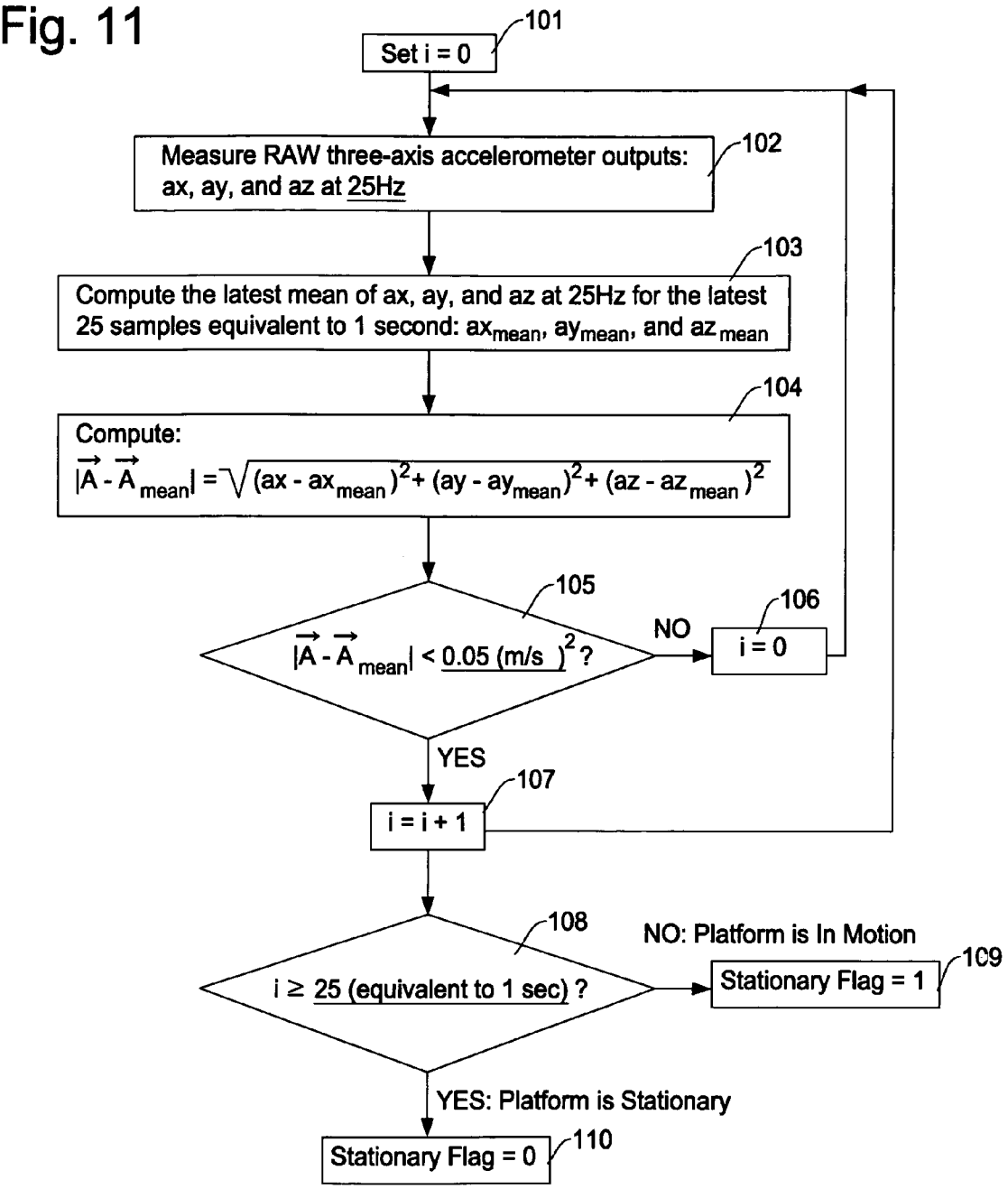
FIG. 11 is a flowchart showing an example of basic operational process for the stationary detection method of the present invention.

The process starts at step 101 of FIG. 11 by setting the stationary status counter reading i=0. In step 102, the process measures the raw outputs of the three-axis accelerometer. FIG. 5 shows the actual raw outputs from the three-axis accelerometer unit attached to an automobile in which, x, y, and z-axes are directed approximately to the vehicle forward, right hand, and downward directions, respectively (although not necessary). These are the outputs from an actual 1-hour drive including intensive cornering made inside a spiral parking tower (from 900 to 1150 seconds). According to the vector analysis, these are the components of a total acceleration vector, $\vec{A}$, namely, $$\vec{A} = ax\,\hat{x} + ay\,\hat{y} + az\,\hat{z} \text{ (m/s}^2\text{)}$$

Figure 6:
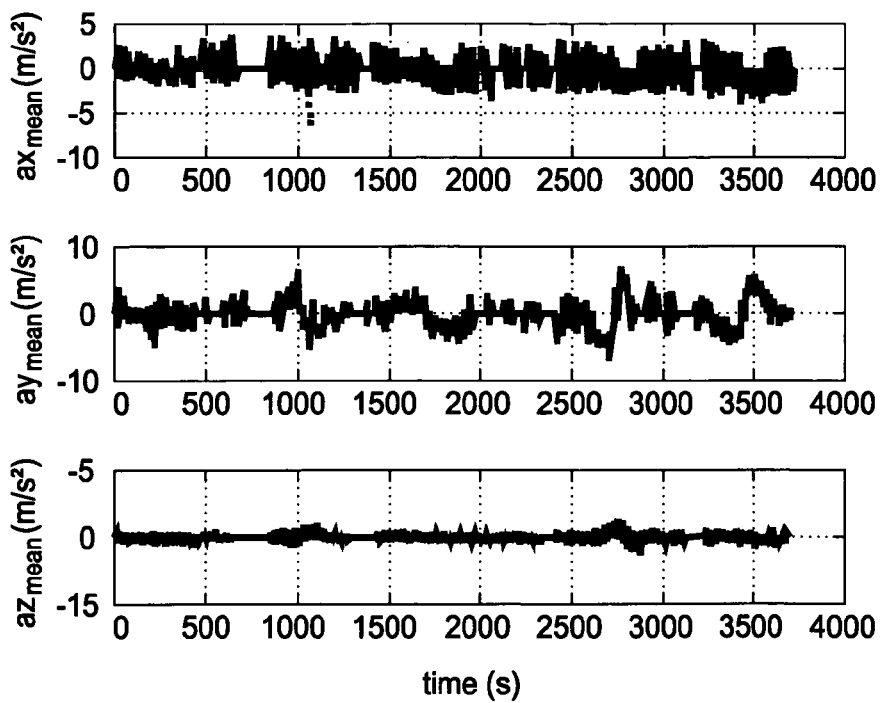
FIG. 6 shows an example of the latest 1-second means of ax, ay, and az, namely, $ax_{mean}$, $ay_{mean}$, and $az_{mean}$ derived from the raw outputs of FIG. 5.

Then in step 103 of FIG. 11, the process takes the latest mean of each sensor output with a specific time window. A one-second time window is used here as an example, i.e., the mean of the latest 25 samples measured at 25 Hz. FIG. 6 shows an example of the latest one-second mean of the actual accelerometer outputs. According to the vector analysis, these are the components of a mean acceleration vector $\vec{A}_{mean}$, namely, $$\vec{A}_{mean} = ax_{mean}\,\hat{x} + ay_{mean}\,\hat{y} + az_{mean}\,\hat{z} \text{ (m/s}^2\text{)}$$

Figure 7:
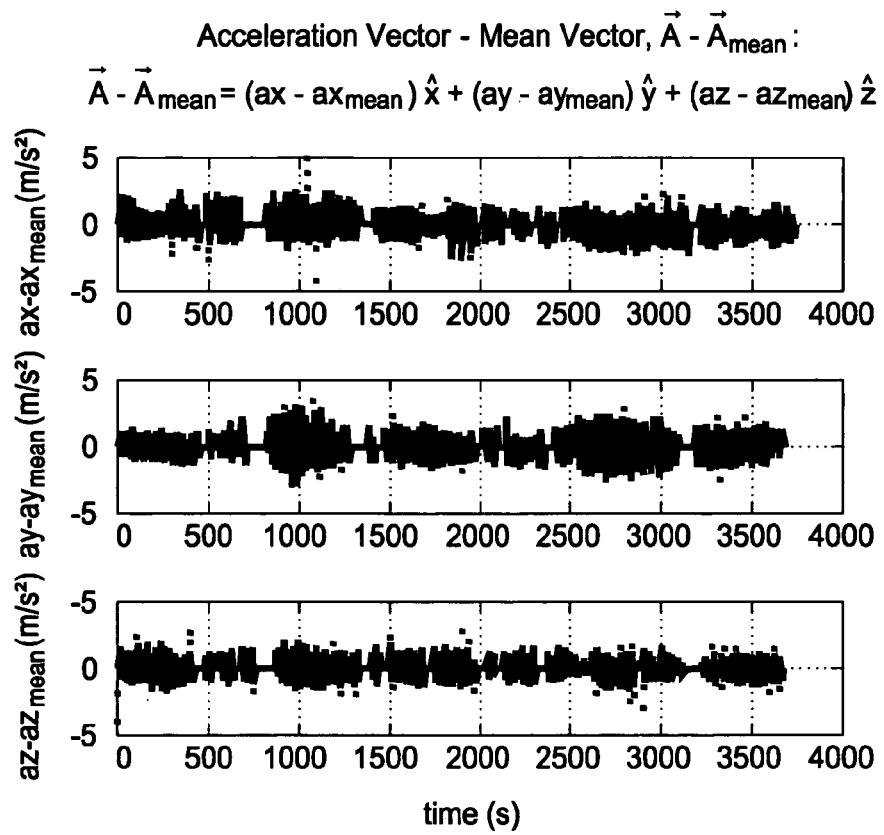
FIG. 7 shows the differentials of the raw outputs of FIG. 5 and the latest 1-second mean values of FIG. 6.

In step 104 of FIG. 11, the process then simply subtracts the mean value of FIG. 6 from each raw component of FIG. 5. An example of the results is shown in the graph of FIG. 7. According to the vector analysis, these are the components of a differential acceleration vector $\vec{A}-\vec{A}_{mean}$, namely, $$\vec{A} - \vec{A}_{mean} = (ax-ax_{mean})\hat{x} + (ay-ay_{mean})\hat{y} + (az-az_{mean})\hat{z}$$

Figure 8:
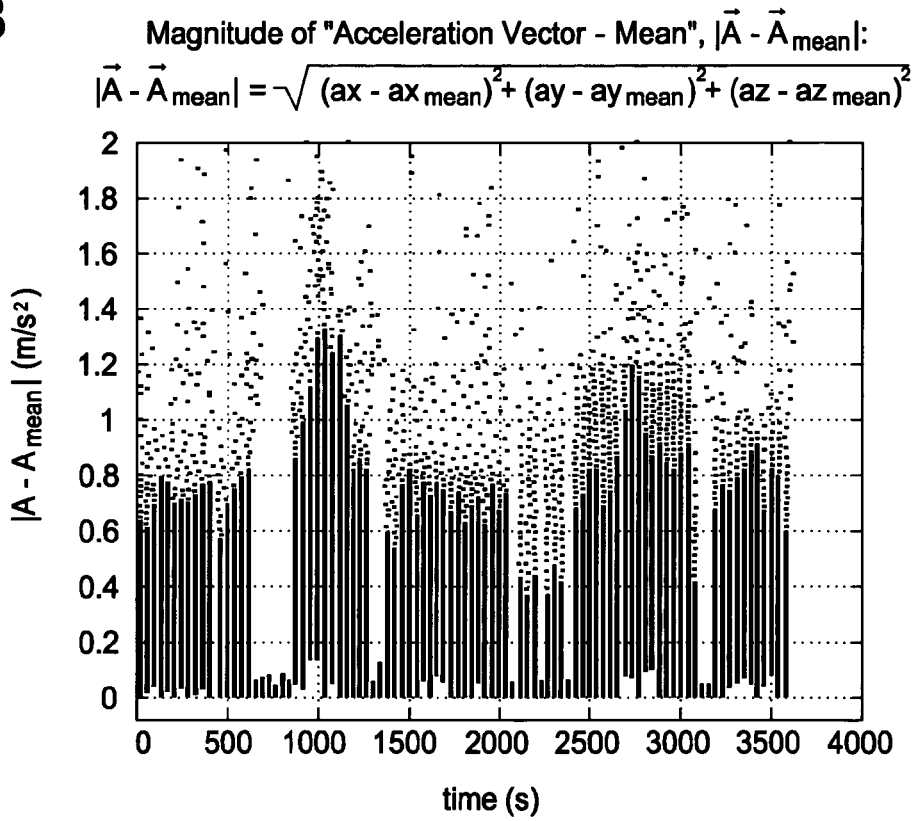
FIG. 8 shows the amplitude of the differential acceleration vector that corresponds to the differential of FIG. 7.

Since $\vec{A}-\vec{A}_{mean}=\vec{0}$ holds during a stationary period, the process seeks for the period meeting $$|\vec{A} - \vec{A}_{mean}| = 0 \text{ (or very small)}$$

by evaluating the amount of $$|\vec{A} - \vec{A}_{mean}| = \sqrt{(ax-ax_{mean})^2 + (ay-ay_{mean})^2 + (az-az_{mean})^2}$$

which is shown in FIG. 8. Note that $|\vec{A}-\vec{A}_{mean}|=0$ (or very small) appears as the vehicle stops.

In a practical application, as in step 105, it is preferable to set a threshold value, e.g., 0.05 (m/s$^2$), to detect possible stationary status by $$|\vec{A} - \vec{A}_{mean}| < 0.05 \text{ (m/s}^2\text{): for possible stationary status}$$

Figure 9:
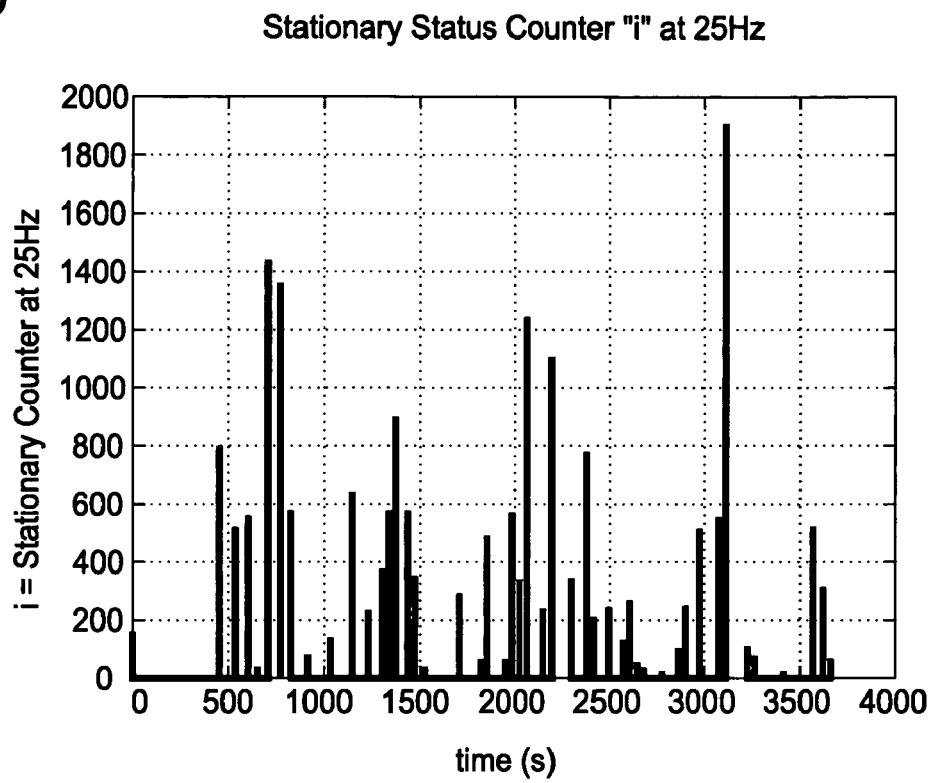
FIG. 9 shows the readings of stationary counter "i" which are sampled by a predetermined rate.

In step 107 of FIG. 11, to make sure the stationary status firmly, it is preferable to count the endurance of the successful small amplitude increasing a counter, "i", when $|\vec{A}-\vec{A}_{mean}|<0.05$ (m/s$^2$) is met. Namely, every time when the difference between the raw outputs and the latest mean is smaller than the predetermined threshold value, the reading of the counter is incremented by one. Otherwise, the counter is reset to 0 in step 106. FIG. 9 shows the consequent stationary counter "i" in which it is possible to determine that the platform is stationary when "i" exceeds a certain time period, e.g., 1 second corresponding to i=25 at 25 Hz as indicated by step 108 of FIG. 11.

Figure 10:
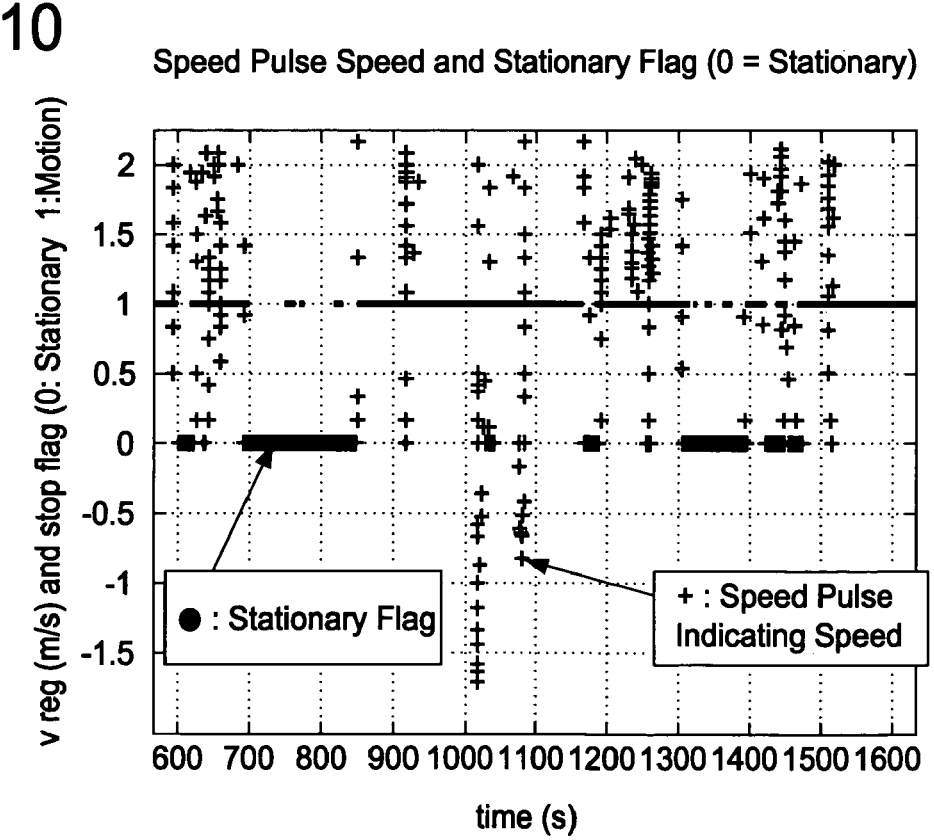
FIG. 10 shows the reference speed-pulse-indicating speed and the Stationary Flag where "0" indicates a stationary status and "1" indicates an in-motion status.

Finally, it is set Stationary Flag=0 when i≧25 indicating the "Stationary" status in step 110 otherwise let Stationary Flag=1 indicating the "In Motion" status in step 109. It should be noted that "0" and "1" can be defined in the other way around. FIG. 10 shows the Stationary Flag by "•" or thick lines overlapped by accurate speed-pulse-indicating speed with "+" as reference. Note that when the reference speed of "+" is 0, the method of the present invention also accurately indicates that it is stationary by "•" at 0.

Navigation Application

Figure 12:
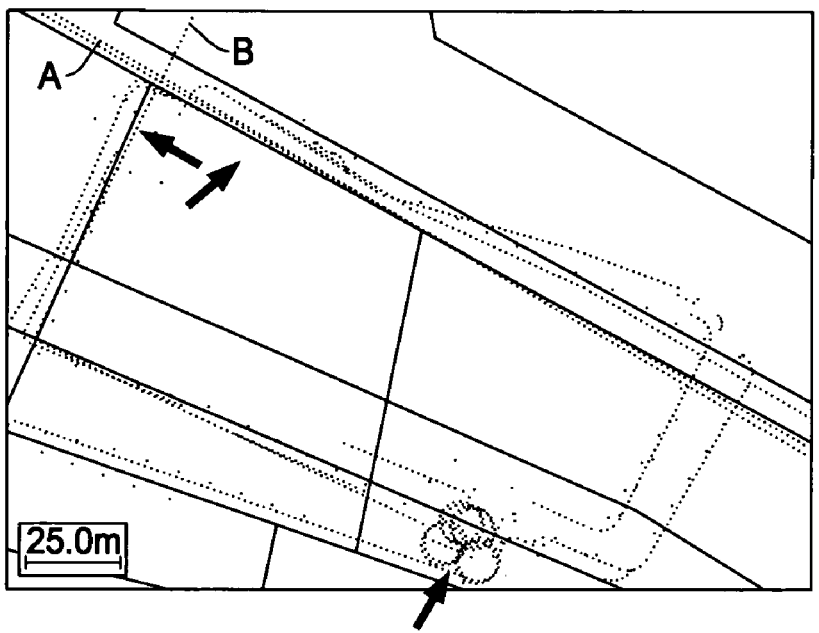
FIG. 12 shows navigation trajectory using a conventional six degrees of freedom integrated INS/GPS without using the present invention.
Figure 13:
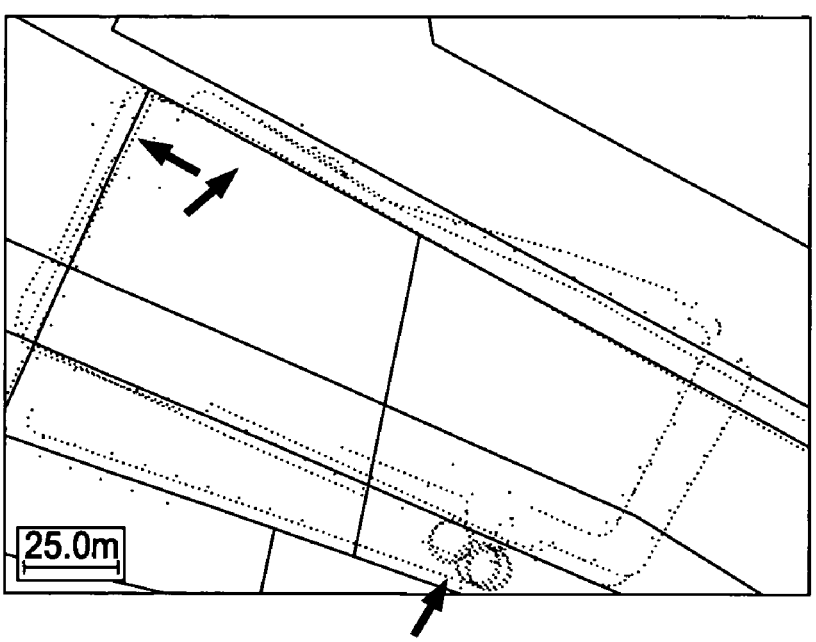
FIG. 13 shows navigation trajectory using the six degrees of freedom integrated INS/GPS using the present invention.

FIGS. 12 and 13 suggest an application of the present invention. FIG. 12 shows navigation trajectory using MEMS six degrees of freedom integrated INS/GPS without using speed pulses, and without using the present invention. Because of GPS dropouts during certain stationary time periods, erroneous accelerations are accumulated as indicated by the arrows: vehicle trajectories are unnecessarily extended straightly at A and B. FIG. 13 shows the results of applying the present invention to the same navigation system to execute corrective actions during the detected stationary status: extra measurement of "velocity=0" condition applied. Note that unnecessary extensions have now disappeared in FIG. 13.

What is claimed is:

1. A method to detect a platform stationary status for a navigation system, comprising the following steps of:
   measuring amplitudes of raw outputs of a three-axis accelerometer mounted on a platform at a predetermined sample rate;
   computing a latest mean value of outputs of the three-axis accelerometer for latest samples within a predetermined time length;
   subtracting the latest mean value of the three-axis accelerometer outputs with a fixed time window from the raw three-axis accelerometer outputs; and
   determining a stationary state of the platform when a difference between the latest mean value and the raw outputs is less than a threshold value.

2. A method to detect a platform stationary status as defined in claim 1, further comprising a step of mounting the three-axis accelerometer on the platform without regard to orientation of the three-axis accelerometer with respect to the platform.

3. A method to detect a platform stationary status as defined in claim 1, wherein said step of determining a stationary state of the platform includes a step of incrementing a counter every time when the difference between the latest mean value and the raw outputs is less than a threshold value.

4. A method to detect a platform stationary status as defined in claim 3, wherein said step of determining a stationary state of the platform includes a step of generating a stationary flag when reading of the counter indicating the difference less than the threshold value exceeds a predetermined time length.

5. An apparatus for detecting a platform stationary status for a navigation system, comprising:
   a processor for controlling an overall operation for detecting a platform stationary status; and
   a three-axis accelerometer mounted on the platform whose stationary status is detected;
   wherein said processor is configured to conduct the following operations of:
   measuring amplitudes of raw outputs of the three-axis accelerometer at a predetermined sample rate;
   computing a latest mean value of outputs of the three-axis accelerometer for latest samples within a predetermined time length;
   subtracting the latest mean value of the three-axis accelerometer outputs with a fixed time window from the raw three-axis accelerometer outputs; and
   determining a stationary state of the platform when a difference between the latest mean value and the raw outputs is less than a threshold value.

6. An apparatus for detecting a platform stationary status as defined in claim 5, wherein said processor is further configured to conduct an operation of mounting the three-axis accelerometer on the platform without regard to orientation of the three-axis accelerometer with respect to the platform.

7. An apparatus for detecting a platform stationary status as defined in claim 5, wherein, when determining a stationary state of the platform, said processor causes to increment a counter every time when the difference between the latest mean value and the raw outputs is less than a threshold value.

8. An apparatus for detecting a platform stationary status as defined in claim 7, wherein, when determining a stationary state of the platform, said processor causes to generate a stationary flag when reading of the counter indicating the difference less than the threshold value exceeds a predetermined time length.

9. An integrated INS/GPS navigation system, comprising:
   an INS having a three-axis accelerometer and a stationary status detection unit that receives outputs of the three-axis accelerometer;
   a GPS receiver which receives satellite signals from a plurality of satellites to produce GPS measurements indicating an absolute position and velocity of the ground vehicle; and
   a Kalman filter which combines outputs of the INS and the GPS receiver and performs a Kalman filter processing;
   wherein the stationary status detection unit determines a stationary status of a platform based on the outputs of the three-axis accelerometer by conducting the following operations of:
   measuring amplitudes of raw outputs of the three-axis accelerometer mounted on the platform at a predetermined sample rate;
   computing a latest mean value of outputs of the three-axis accelerometer for latest samples within a predetermined time length;
   subtracting the latest mean value of the three-axis accelerometer outputs with a fixed time window from the raw three-axis accelerometer outputs; and
   determining a stationary state of the platform when a difference between the latest mean value and the raw outputs is less than a threshold value.

10. An integrated INS/GPS navigation system as defined in claim 9, wherein said stationary status detection unit is further configured to conduct an operation of mounting the three-axis accelerometer on the platform without regard to orientation of the three-axis accelerometer with respect to the platform.

11. An integrated INS/GPS navigation system as defined in claim 9, wherein, when determining a stationary state of the platform, said stationary status detection unit causes to increment a counter every time when the difference between the latest mean value and the raw outputs is less than a threshold value.

12. An integrated INS/GPS navigation system as defined in claim 11, wherein, when determining a stationary state of the platform, said stationary status detection unit causes to generate a stationary flag when reading of the counter indicating the difference less than the threshold value exceeds a predetermined time length.

* * * * *